United States Patent [19]
Watney

[11] Patent Number: 5,930,398
[45] Date of Patent: Jul. 27, 1999

[54] METHOD AND APPARATUS FOR DETERMINING A QUANTIZING FACTOR FOR MULTI-GENERATION DATA COMPRESSION/DECOMPRESSION PROCESSES

[75] Inventor: John P. Watney, Los Altos, Calif.

[73] Assignee: Ampex Corporation, Redwood City, Calif.

[21] Appl. No.: 08/777,058

[22] Filed: Dec. 30, 1996

Related U.S. Application Data

[63] Continuation of application No. 08/200,531, Feb. 22, 1994, abandoned, which is a continuation of application No. 07/731,557, Jul. 17, 1991, abandoned, which is a continuation-in-part of application No. 07/688,923, Apr. 18, 1991, abandoned.

[51] Int. Cl.$^6$ ........................................................ G06K 9/38
[52] U.S. Cl. ........................ 382/239; 382/251; 382/250; 348/390; 386/52; 386/109
[58] Field of Search ...................................... 382/239, 251, 382/270, 248, 250; 348/586, 587, 588, 589, 600, 403, 405, 390; 358/426, 430, 433; 386/1, 4, 33, 46, 52, 64, 111, 112, 109

[56] References Cited

U.S. PATENT DOCUMENTS

| | | | |
|---|---|---|---|
| 4,722,003 | 1/1988 | Kondo | 348/421 |
| 4,807,298 | 2/1989 | Conte et al. | 382/253 |
| 4,831,636 | 5/1989 | Taniguchi et al. | 348/405 |
| 4,920,426 | 4/1990 | Hatori et al. | 348/430 |
| 5,025,482 | 6/1991 | Murakami et al. | 348/416 |
| 5,065,229 | 11/1991 | Tsai et al. | 348/391 |
| 5,072,290 | 12/1991 | Yamagami et al. | 348/396 |
| 5,073,821 | 12/1991 | Juri | 348/405 |
| 5,142,380 | 8/1992 | Sakagami et al. | 382/250 |
| 5,146,324 | 9/1992 | Miller et al. | 348/405 |
| 5,150,208 | 9/1992 | Otaka et al. | 348/420 |
| 5,191,436 | 3/1993 | Yonemitsu | 358/311 |
| 5,301,018 | 4/1994 | Smidth et al. | 348/420 |
| 5,301,242 | 4/1994 | Gonzales | 382/239 |

OTHER PUBLICATIONS

Japanese Abstract Publication No. JP1162080, 26–06–89 Applicant: Sony Corp, Inventor: Hattori Masayuki.

Japanese Abstract Publication No. JP3024886, 01–02–91 Applicant: Nippon Telegr & Teleph Corp Inventor: Irie Kazunari.

Japanese Abstract Publication No. JP2236791, 19–09–90 Applicant: NEC Corp, Inventor: Watanabe Akito.

(List continued on next page.)

*Primary Examiner*—Jon Chang
*Attorney, Agent, or Firm*—John G. Mesaros; George B. Almeida; James A. LaBarre

[57] ABSTRACT

The invention provides techniques for changing the quantization used in multiple generations of selected complexity of data quantization such that the errors incurred in subsequent generations are substantially the same as the error incurred in a generation given the same complexity of data. To this end, in a preferred embodiment, quantizing factors are selected from a preselected finite non-degenerative set of quantizing factors provided in the form of arrays of a periodic series of individual quantizer values, wherein a special numerical relationship is maintained between corresponding quantizer values in successive arrays. A different quantizing factor may be selected for each generation of compression/decompression as required by changing data complexity as when performing a layering process during the generations. In another embodiment, an over-quantizing factor is chosen large enough to compress the data to a greater extent than that required in the first generation, such that sufficient compression still is provided in subsequent generations even though the same quantizing factor is used while the complexity of the data is being changed. Adjunct features include the determination of an unknown quantizing factor applied in a previous generation, and a dither rounding process to compensate for an increase in noise due to changing a quantizing factor in the embodiment which uses the over-quantizing factor.

50 Claims, 6 Drawing Sheets

OTHER PUBLICATIONS

The Role Of Image Data Compression In Professional Video Recording, pp. 1–24 John Kearney and Charles Coleman, SMPTE, Oct. 21–25, 1989.

New ADRC for Consumer Digital VCR, T. Kondo, Y. Fujimori, H. Nakaya, A. Yada, K. Takahashi and M. Uchida, SONY Corp., Japan.

Dynamic Rounding in Digital Video Processing: An Update, D. Peter Owen SMPTE Journal, Jun., 1989.

Morrison, "Multigeneration Performance of a Digital Composite VTR", SMPTE Journal, Oct 1989 pp. 732–737.

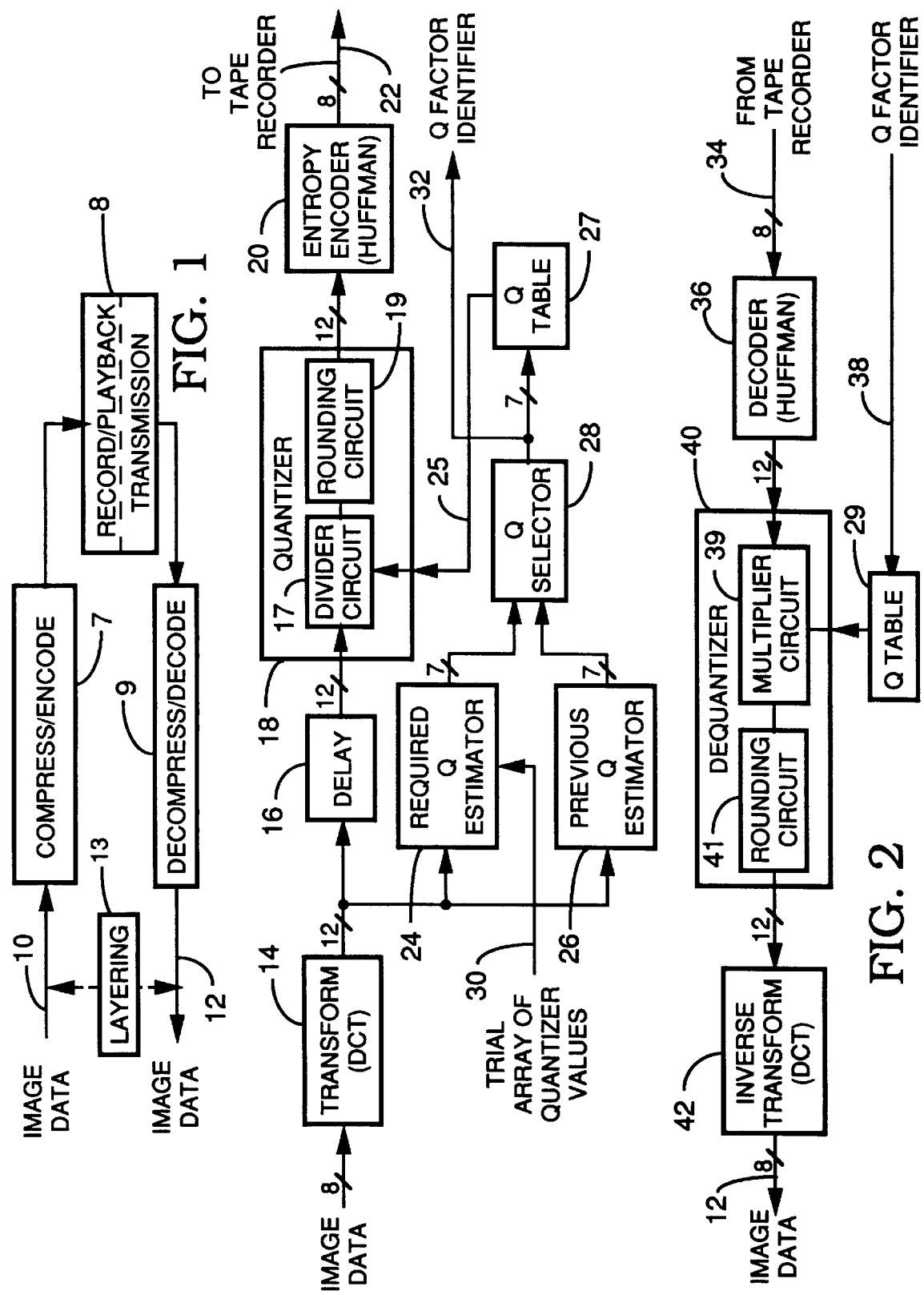

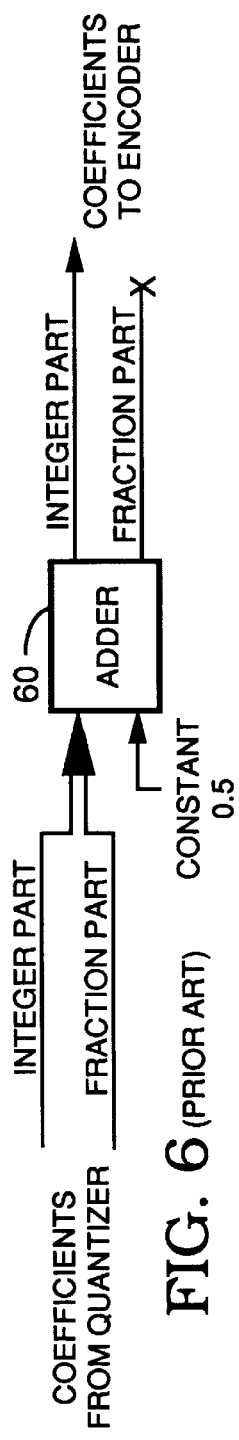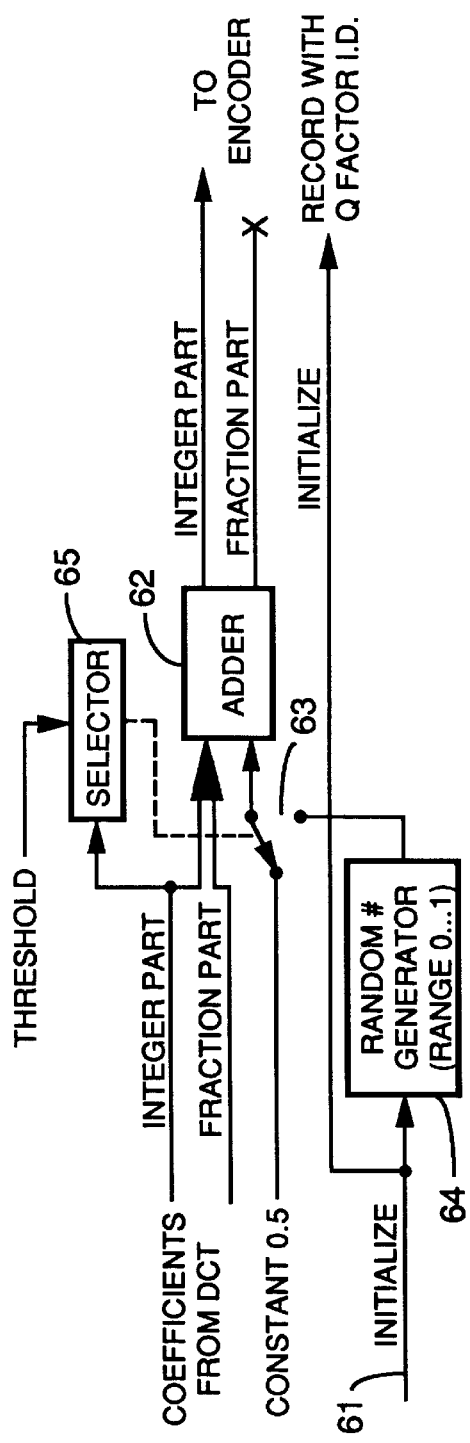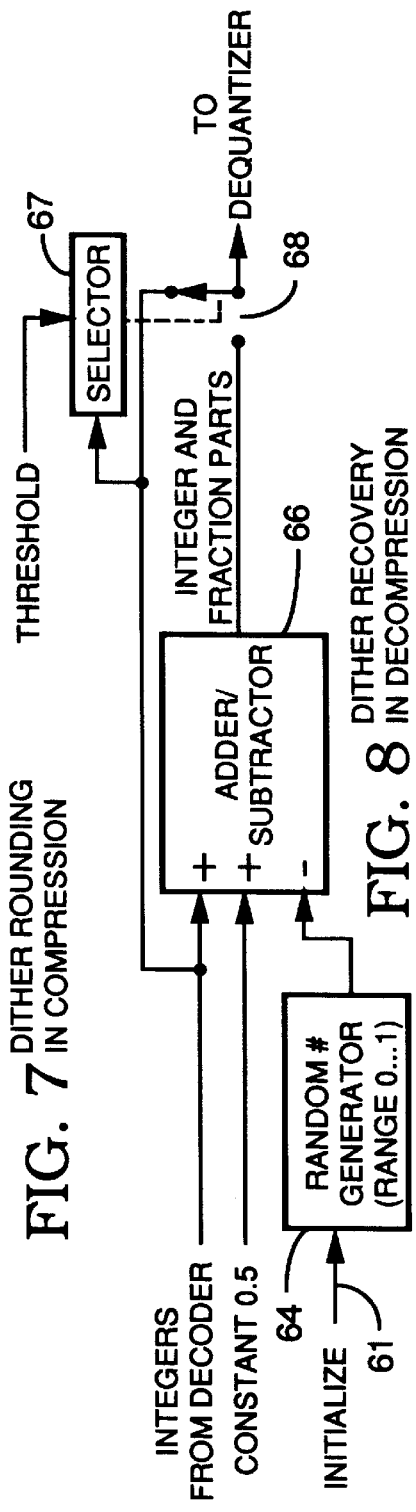
FIG. 6 (PRIOR ART)
FIG. 7 DITHER ROUNDING IN COMPRESSION
FIG. 8 DITHER RECOVERY IN DECOMPRESSION

METHOD AND APPARATUS FOR DETERMINING A QUANTIZING FACTOR FOR MULTI-GENERATION DATA COMPRESSION/DECOMPRESSION PROCESSES

This application is a continuation of application Ser. No. 08/200,531, filed Feb. 22, 1994, now abandoned, which is a continuation of application Ser. No. 07/731,557, filed Jul. 17, 1991, now abandoned, which is a continuation-in-part of application Ser. No. 07/688,923, filed Apr. 18, 1991, now abandoned.

BACKGROUND OF THE INVENTION

The invention relates to data compression processes and particularly to a method for determining preferred quantizing factors which limit degradation in data signal quality incurred during multi-generation compression and decompression cycles given a selected cumulative complexity, to substantially the degradation incurred in a generation with the same cumulative complexity. The method also concerns supplying an optimal rounding algorithm and estimating the quantizing factors applied in a previous generation if they are not explicitly available.

Typical television broadcast and post production equipment and processes have used digital technology to take advantage of the power and flexibility inherent in the digital format. The advantages in using the digital format are particularly evident when applied to the manipulation of images in, for example, post production processes during which the information content of the images may be increased, decreased and/or rearranged such as is done in the process commonly known as "layering". In such processes, the storage and manipulation of television images using digital technology was first performed with random access disc recorders. The utility of the digital disc recorders was not so much in their random access capability, as it was in their ability to re-record images for multiple generations without the loss of fidelity caused, for example, when recording multiple generations with analog recorders.

By way of explanation of the terms "multiple generations" or "multi-generations" as employed in the description herein, each sequence of recording and playing back of a video image signal results in the reproduction of a copy that is a "generation" removed from the original or preceding video image signal. Thus, "multi-generations" defines a sequence of selected repetitions of an image signal through a given signal process such as, for example, consecutive recorded tape reproductions, post production editing or layering processes, etc. In practice, some deterioration of the video image signal occurs during the record and reproduce processes because of imperfections in the record and reproduce equipment. This deterioration is manifested in the reproduced video images as signal amplitude, frequency and/or phase errors. The extent of deterioration is cumulative and thus increases markedly as the number of record and playback sequences, that is, "generations" experienced by the video image signal increases. Even in the absence of layering, a few record/playback sequences of an analog video image through imperfect or misadjusted equipment, such as may occur during electronic editing processes, produce severe deterioration in the final generation of the video image signal obtained.

It is well known that the size and cost of any present or future digital recorder is directly related to its data rate and storage capacity. Accordingly, there are increasing numbers of applications in which there is a strong incentive to reduce these requirements as, for example, by using some form of data compression. This is particularly true for digital video tape recorders, disc recorders and other high density television and data recorders. Various configurations of these recorders commonly are used in television post production processes, where 10 to 20 generations of, for example, video image data are common and more than 50 generations are occasional requirements. To be acceptable, a compression algorithm used in these recorders must meet the same multi-generation requirements as are imposed on D-1 component and D-2 composite color video tape recording standards, that is, a 4.5 image rating on the CCIR 600 five point scale.

In the event that image data is compressed before being recorded by a digital disc or an analog or digital tape recorder, it is well known that the process experiences an inherent initial quantization error which is generally a one time error occurrence. In the absence of uncorrectable recorder errors, initial quantization errors generally do not get worse with subsequent multiple generations of compression and decompression. This is only true, however, if there is no additional processing of the television image between the generations. Image processing such as the process of image "layering" mentioned above, wherein additional image data are superimposed on, or undesired image data are removed from, an existing video image, introduces quantization roundoff errors, otherwise known as rounding errors. The rounding errors are the inherent distortion introduced into the signal by the quantization process, wherein a range of values is divided into a finite number of smaller sub-ranges, each of which is represented by an assigned or "quantized" value within the sub-range. The introduction of rounding errors in subsequent generations after the first generation, will degrade the signal-to-noise ratio in some way with each generation. Fortunately it is extremely rare for any one area of an image to be processed more than a few times even if it is re-recorded very many times.

In the case of compression and decompression cycles an additional requirement is that the compression ratio, that is, the quantizing factor, is constant for each area of the image, for each generation. In order to achieve some worthwhile compression ratio, most compression algorithms do not compress all areas of the image to the same degree. Busy areas in the picture produce more data than quiet areas and thus a coarser quantizing factor generally is applied to the data in busy areas. Accordingly, in typical data compression processes, the average compression parameters are selected and/or adjusted to provide the desired total recorded data per image. That is, in video image compression applications it generally is desirable to compress video images to a particular data block size (in bits) or average data rate (in bits per second). The quantizing factor, other parameters being constant, is chosen to yield the desired compressed data block size or average data rate that will just fit the data into a desired data block length, and/or into an allotted recording space on the disc or tape. To this end, some compression algorithms adjust their parameters dynamically from block to block of data. Others adjust a single set of parameters each generation for use over a relatively large area of the image, up to the entire image.

It has been determined that if the same image is compressed and decompressed many generations, it will not suffer any substantial degradation beyond the first generation, particularly if the same quantizing factor is used for each area. However, if the image is changed in some way between generations, that is, if an image layering process is performed, and the usual different optimum quantizing factors which precisely fit the compressed data into the allotted space are used to achieve the same compression in each generation, the complexities of the conditions can lead to a rapid degradation in image quality. In addition, the normal rounding technique of adding a constant 0.5 and truncating the fractional part, accelerates the degradation.

It follows that it would be highly desirable to provide a compression/decompression technique for accomplishing multiple generation image layering without degrading image quality, wherein each generation introduces an increased or decreased layer of data over a portion of the existing image whereby the layer is more or less complex than the portion of the image it replaces. Such multiple layering processing results in slightly more, or slightly less, compression being required with each generation. The technique should compensate for the increase or decrease in compression required, while still maintaining the optimal image fidelity throughout the successive generations after the first.

SUMMARY OF THE INVENTION

The present invention overcomes the shortcomings of typical prior art, by providing techniques and associated embodiments for compressing and decompressing data signals through multiple generations while limiting the data signal degradation to little more than that which inherently is suffered incurred in a first or initial generation of compression given the same data signal complexity. That is, the invention technique provides for changing quantization in multiple generations of quantization in which the data signal complexity may be varied, such that the errors after the final quantization generation are approximately the same as the errors generated in a quantization of the same data signal complexity.

In the preferred embodiments, the invention provides for the selection of an "over-quantizing" factor, a finite "non-degenerative set of quantizing" factors, and/or a "dither rounding" algorithm, which minimize degradation in image quality typically incurred as a result of performing a data layering process during multi-generation compression and decompression cycles. Although the embodiments are described herein with respect to an image and/or an image data signal for reasons of simplifying the description only, it is readily apparent to those skilled in the art that the invention is equally applicable to other data signals of a pseudo periodic nature.

More particularly, in a basic concept of the invention technique, a trial quantizing factor first is selected by experience as a mid-range value for an image of average information complexity. After additional iterations if necessary, in which the trial quantizing factor is refined, an over-quantizing factor is chosen whose value is large enough to compress the image to a greater extent than that required in the first generation. That is, the over-quantizing factor is sufficiently large enough that sufficient compression still is provided in subsequent generations even though the same over-quantizing factor is used, while the complexity of the image is being increased by layering processes during the multiple generations. More particularly, the over-compression selected, for example, in the first generation, is a function of the expected cumulative increase in image complexity by any successive layering operations performed during subsequent generations. It follows that the quantizing factor need not be changed in subsequent generations even though there is an increase in image complexity, due to the fact that a larger over-quantizing factor was selected for the first generation than would be required for ideal quantization if only a single generation were performed.

If for some reason the complexity of the image due to layering increases faster than expected, whereby the number of bits or the data rate of the compressed image becomes unacceptable, it becomes necessary to increase the quantizing factor in order to fit the image into the available space. Also, it may be necessary to decrease the quantizing factor in the event that the image complexity decreases by a significant amount. If such a change in the quantizing factor is unavoidable, the invention technique includes an optimal rounding algorithm, or "dither rounding" technique where, instead of adding a constant 0.5 before truncating in the rounding process as is commonly done at present in compression processes, random numbers with, for example, a generally uniformly distributed energy spectrum in the range 0 . . . 1.0, are selectively added as determined by a threshold. In this way, any image degrading rounding sequences are broken up, although at the expense of additional random errors. However, the distribution of the random numbers may be selected to minimize the visibility of the errors.

In a preferred embodiment of the invention, the quantizing factor may be selected from the predefined finite non-degenerative set of quantizing factors of previous mention. By way of example trial quantizing factor may be estimated and, via additional iterations if necessary, a quantizing factor of the non-degenerative set which comfortably fits the compressed data into the allotted data block length and/or recording space, then is selected for the first generation. In subsequent generations of compression/decompression with layering of additional image data, different respective quantizing factors of the non-degenerative set, each of which readily fits the compressed data into the allotted block length and/or recording space, may be selected with little additional degradation in the image quality in the subsequent generations. By way of example, a finite non-degenerative set of quantizing factors are provided in the form of "arrays" of a periodic series of individual quantizing values, herein termed "quantizer values", wherein a special numerical relationship is maintained between corresponding quantizer values in different arrays. It has been found that the preferred numerical relationship between corresponding quantizer values of the non-degenerative set of quantizing factors is a ratio of the order of three, although other numerical relationships are possible. For example, for a linear non-degenerative set of quantizing factors the preferred numerical relationship is the ratio of approximately a factor of three. However, a non-linear non-degenerative set of quantizing factors does not require a ratio of three but still must meet other criteria imposed on the non-degenerative technique, as described herein. Further, it is to be understood that although the ratio of three is preferred, any number in a given range centered about three is equally well suited. For example, a ratio of 3.005, 3.01 or 3.1, or of 2.995, 2.99 or 2.9, etc. may be used with only correspondingly slightly increased degradation in picture quality.

In the example described herein, a quantizing factor is fully described by an 8×8 array of individual quantizer values which, in the compression process, are applied to an 8×8 array of discrete cosine transform coefficients. The coefficients, in turn, represent an 8×8 group of pixels taken from the video image. By way of example only, the transform coefficients are depicted herein as comprising 12 bit digital samples generated by a transform process from respective 8 bit samples of the video image.

A further feature of the invention includes estimating a quantizing factor applied in a previous generation of image recording, where this information is not available explicitly. The latter feature consists of finding the separation between peaks and/or valleys in a histogram, wherein the amplitudes of the peaks and/or valleys represent the number of counts of the respective values of frequency coefficients to be quantized. The separation between peaks is the reciprocal of the desired multiplicative quantizer if a quantizer of less than 1 is used, and is equal to the dividing quantizer if a quantizer of greater than 1 is used.

In the example herein, quantization is applied to frequency coefficients after taking a discrete cosine transform (DCT), but the technique is applicable to many other compression algorithms using other transformations which at some stage involve quantization. Thus, the term transform "values" is meant to include transforms other than discrete cosine transforms.

BRIEF DESCRIPTION OF THE DRAWINGS

FIG. 1 is a functional block diagram illustrating a data record/playback process in which compression/decompression processes also are performed, wherein the entire cycle of compression, recording, playback and decompression, as well as the cycle of playback, decompression, compression and recording, constitutes one generation of a multi-generation process as discussed herein relative to the invention.

FIG. 2 is a block diagram of a data compression and decompression system illustrating an environment in which the present invention is used.

FIG. 6 is a functional block diagram illustrating a prior art rounding technique used to hide contours when performing data quantization.

FIGS. 7 and 8 are functional block diagrams illustrating dither rounding and recovery for compression and decompression processes, respectively, in accordance with the invention.

DESCRIPTION OF THE PREFERRED EMBODIMENTS

Figure 3:
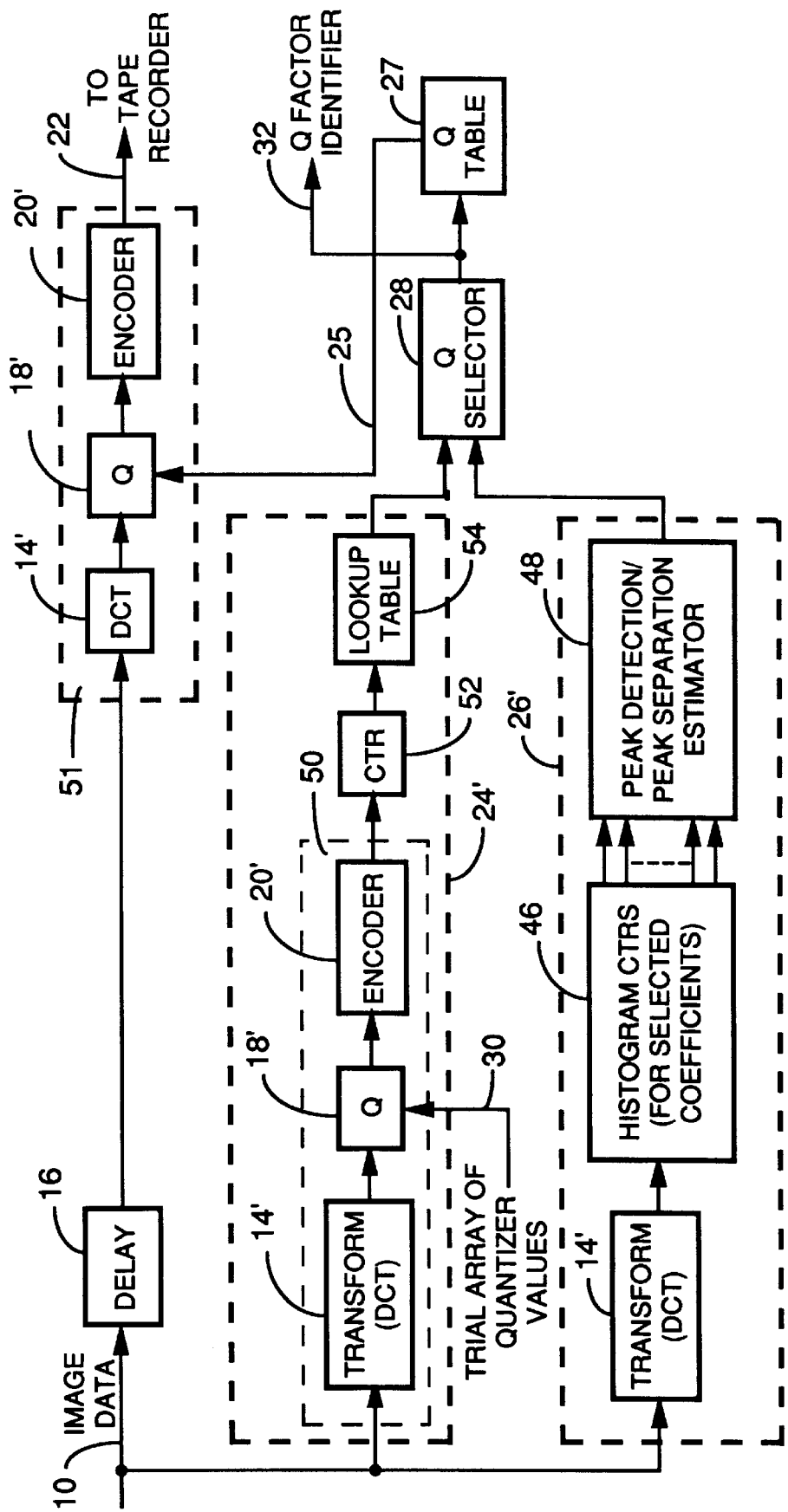
FIG. 3 is a block diagram showing in further detail the Q estimator circuits of the system of FIG. 2.

In a data processing operation such as data compression, quantizing conventionally is performed by effectively multiplying each coefficient by a quantizer which is less than 1, (or by effectively dividing each coefficient by a quantizer which is greater than 1), then rounding the result by the addition of 0.5 and truncating the fractional part of the summation. It has been determined experimentally that if the complexity of the data being processed is increased or decreased during multiple generations, and if the quantizer is changed from generation to generation, the resulting errors due to rounding and truncation grow at an unacceptably large rate. Accordingly, the invention proposes limiting the choice of quantizing factors to (1) an over-quantizing value which then is used through all subsequent generations, and (2) quantizer values selected from a non-degenerative set of quantizing factors, wherein linear values therein have a preselected numerical relationship between corresponding values in different arrays, e.g., of the order of three. In the event the first mentioned over-quantizing technique is applied in generations succeeding the first, and the previous quantizing factor is not available explicitly, the invention estimates the previous quantizing factor from histograms of unquantized transform coefficients. In a further embodiment, in the event an over-quantizing factor must be changed in a subsequent generation, the invention employs a dither rounding algorithm which minimizes the growth of the roundoff errors due to quantization in the corresponding subsequent generation.

FIG. 1 illustrates in functional block diagram a complete "generation" of a record/playback process using the further processes of data compression and decompression, in which the invention techniques are employed to circumvent problems generated when performing data "layering" during multiple generations of the recording/playback processes. As previously mentioned, layering is a process whereby additional image data is added to (or removed from) an existing image during consecutive recording and playback cycles, and which accordingly increases or decreases image complexity. Thus, in FIG. 1 image data corresponding, for example, to a video image, are applied via an input bus 10 to a means 7 for compressing and encoding the data, whereupon the compressed/encoded data are supplied in a suitable format to data recorder/playback apparatus, or to a transmission channel or other utilization apparatus, as depicted via the block 8. The resulting compressed image data subsequently may be supplied to means 9 for decoding and decompressing the data, whereupon the decompressed image data corresponding to the original video image are provided on an output bus 12 to complete a "generation" of data processing. The image data on output bus 12 may be applied to a layering means 13, whose output subsequently may be applied to the input bus 10 to form a generation loop which includes a layering process.

As may be seen, the apparatus loop of FIG. 1 illustrates one record/playback generation commonly performed by a video tape recorder or other recording apparatus. The loop also depicts the processes of compressing/encoding and the inverse processes of decoding/decompressing the data, as well as the process of layering of data on the original image, as an integral part of the complete generation. It follows that the passage of additional cycles of the same data through the apparatus loop of FIG. 1 such as may be employed, for example, in television post production facilities, constitutes the multi-generation process referred to in the description herein. Correspondingly, as may be employed in such post production facilities, a generation may comprise the consecutive processes of playback, decompression, layering, compression and recording, that is, a dequantizing/quantizing process as depicted in the FIG. 1 in which a previously recorded tape is played back, dequantized and the decompressed data signal is then layered prior to compression and recording. As well known in the art, the layering processes may be performed, for example, by apparatus such as video switchers, digital optics data manipulating apparatus and/or graphic art systems.

Although the invention is described herein relative to video image data, it is to be understood that other types of data including, for example, other pseudo periodic signals such as satellite, audio, seismograph, etc, data, and respective processing systems may utilize the invention techniques. For example, the data may be a stream of data bits which are supplied to a transmission channel for transmission to and from a preselected utilization apparatus such as a satellite, etc., wherein the compressed data is fitted into a stream of data block lengths or have a preselected data rate, rather than be recorded in allotted spaces on magnetic tapes or disks.

In addition, to facilitate the description herein, the invention is described by way of example only, in terms of the standards imposed by the Joint Photographic Experts Group (JPEG), which concern technical descriptions of, for example, encoding and decoding algorithms and the encoded data format. In the standards, 8×8 blocks of pixel data are transformed via a suitable transform such as a discrete cosine transform (DCT), into respective 8×8 arrays of DCT coefficients. The 8×8 blocks of samples of pixel data are obtained by dividing the input sample array into contiguous 8×8 blocks of pixels which, in turn, are derived from a subdivision of, for example, a luminance component (Y), and chrominance components (R-Y, B-Y) image, with vertical resolution of 576 rows and horizontal resolution of 720 columns of the Y component, or 360 columns of the R-Y, B-Y components. The 8×8 array of DCT coefficients is ordered with the DC component in the upper left corner, with increasing horizontal "frequencies" to the right of the array and with increasing vertical "frequencies" towards the bottom of the array.

FIG. 2 illustrates in block diagram a data compression/decompression system modified in accordance with the present invention, for compressing and encoding video image data corresponding, for example, to the image data signal of FIG. 1, and also for decoding and decompressing the previously compressed and encoded data. The video image data are formed of a serial stream of 8 bit digital samples of the 8×8 blocks of pixel data recommended, for example, by the JPEG standard of previous mention, and are supplied, via the input bus 10, to a transform process herein illustrated as a discrete cosine transform (DCT) circuit 14 by way of example only. It is to be understood that other transform processes and other block sizes may be used instead. The resulting 8×8 array of transform coefficients is supplied as 12 bit samples from the DCT circuit 14 to a delay circuit 16 and thence to a quantizer circuit 18. The delay circuit 16 provides a time delay equivalent to the time required to estimate and select a quantizing factor via a parallel channel further described below. As shown, the quantizer circuit 18 typically includes a circuit 17 for effectively dividing the transform coefficients by selected quantizer values, and a circuit 19 for rounding (truncating) the resulting values of the division process. The quantizer circuit 18 is coupled to an entropy encoder circuit 20 which is illustrated herein by way of example only, as a Huffman encoder. It is to be understood that other equivalent encoding processes may be used instead. The signal is provided on an output bus 22 as a compressed/encoded video data signal, which is in a suitable format of 8 bit digital samples for recording on tape or disc, or for transmission to other utilization apparatus. The output signal from the encoder circuit 20 may be a serial stream of digital samples of varying numbers of bits. A typical system for providing the functions of the compression/encoder circuits 14, 18, 20 may be found in the application U.S. Ser. No. 07/560,606, filed Jul. 31, 1990, now U.S. Pat. No. 5,146,324, and entitled Data Compression Using A Feedforward Quantization Estimator, assigned to the same assignee as this application, and incorporated herein by reference.

In accordance with the invention, the compression/decompression system also supplies the output of the DCT circuit 14 to a "required" Q estimator circuit 24 as well as to a "previous" Q estimator circuit 26. As implied by the titles, the circuit 24 provides means for determining the quantizing factors for a subsequent compression/decompression process, and the circuit 26 provides means for determining unknown quantizing factors used in a previous compression/decompression process, as further described in FIGS. 3–5. For simplifying the description, the letter "Q" is used herein at times as a convenient identification for an array of individual quantizer values, one for each coefficient to be quantized. The outputs of the two estimator circuits 24, 26 are supplied for example, as 7 bit digital samples, to a Q selector 28 whose output, in turn, enables the quantizer values from a Q lookup table circuit 27. In the JPEG standard, each array may contain 8×8 or 64 individual quantizer values. The table circuit 27 contains a selected number of arrays of quantizer values, and for the 7 bit input shown here contains 128 arrays of 64 quantizer values. The quantizer values corresponding to the selected array are supplied to the quantizer circuit 18 via a bus 25, and determine the compression ratio resulting from the compression process. More particularly, Q selector 28 and table circuit 27 supply digital values corresponding to the quantizer values to be used by the divider circuit 17 in the compression process.

Thus, in a first generation of a record/playback process, the transform coefficients from the DCT circuit 14 are supplied to the required Q estimator circuit 24, which also receives a trial array of quantizer values supplied via a trial Q bus 30. The trial array of quantizer values is a mid-range value selected by experience for an image of average information complexity. The required Q estimator circuit 24 generates a signal indicative of how much quantization is required to provide the number of bits of compressed data which just fills the allotted space in the data block to be recorded, or which provides the desired data block length or average data rate in a serial stream of data samples. More particularly, the Q estimator circuit 24 in turn provides, to the Q selector 28, a Q factor identifier signal which identifies the array which will properly compress the video image data to the preselected extent needed for the particular application. The Q lookup table circuit 27 then supplies the individual quantizer values of the selected array to the quantizer circuit 18. The preferred embodiment herein describes the use of lookup tables to provide individual quantizers, but a combination of lookup tables and computation is equally applicable. For example, if i and j represent respectively the horizontal row and vertical column numbers of an array, and k represents the Q factor identifier number, then an individual quantizer value q may be computed from an equation such as the following: $q_{ij}=3$ to the power of (integer((i+j)/k)). A typical system for providing the functions of the required Q estimator circuit 24 may be found in the application U.S. Ser. No. 07/560,606 of previous mention.

In a next generation of a multi-generation process in which layering may have increased or decreased the image complexity, the transform coefficients corresponding to the new video image data are supplied from the DCT circuit 14 to the previous Q estimator circuit 26 as well as to the required Q estimator circuit 24 as in the previous generation. The previous Q estimator circuit 26, supplies a signal indicative of how much quantization, if any, was used previously on the incoming video image data. The input signal may be that supplied in a second or later generation, or may be an unknown signal recovered from a new tape wherein the data might or might not have been compressed. The new Q factor identifier signal from the previous Q estimator circuit 26 also is supplied to the Q selector 28 along with the output from the required Q estimator circuit 24. Thus, after the first generation, the signal supplied by the Q selector 28 is based not only on the estimate of what Q factor is required, but also on what Q factor was used in the compression process of the last generation. That is, the Q selector 28 selects one of the values from the two estimator circuits 24, 26. The Q factor selected is the one which provides the greater compression, unless the Q factor from the required Q estimator 24 provides significantly less compression (typically a factor of five) than the Q factor from the previous Q estimator 26. In this situation, the complexity of the image has decreased so significantly that it would be impractical to not lower accordingly the compression ratio, and thus the Q factor from the required Q estimator 24 is selected. As in the previous generation, the appropriate individual quantizer values generated on bus 25 via the Q lookup table circuit 27, are supplied to the quantizer circuit 18 and are applied to the video image data signal which has been suitably delayed by the delay circuit 16. The compressed and encoded video image data then are supplied via the output bus 22 to a recorder for subsequent recording, to a transmission channel for other utilization, or to other utilizing means, as depicted previously via the block 8 in FIG. 1.

The identities of the Q factors, or of the individual quantizer values, used in the compression process also are suitably recorded or transmitted as overhead along with the compressed video image data, as depicted via the line 32. The Q factors or quantizer values used in the compression process thus are available for use in a subsequent decompression process, which is another condition of the JPEG standard.

In a subsequent decompression process when the previously compressed and recorded video image data is recovered from an outside source such as the tape recorder of previous mention, the compressed image data is supplied via a bus 34 to a decoder circuit 36. In addition, as depicted via a bus 38, a signal identifying the Q factors or quantizer values used in the previous compression process also is recovered as the Q factor identifier signal which was previously inserted as overhead in the data signal. The identifier signal is supplied to a Q lookup table circuit 29 similar to the Q lookup table circuit 27, wherein the former supplies the individual quantizer values of the same array previously used in the compression process, to a dequantizer circuit 40. The dequantizer circuit 40 includes a circuit 39 for multiplying and a circuit 41 for rounding, which perform the inverse processes of the quantizing process performed by circuit 18, in generally conventional fashion. The decoder circuit 36 decodes the recovered image data and supplies the decoded data to the dequantizer circuit 40. The resulting transform coefficients are supplied, for example, as 12 bit digital samples to an inverse transform circuit 42. The latter circuit supplies a video image data signal on the output bus 12, which signal is a reconstruction of the original video image data signal on input bus 10, with some degeneration in the signal due to the rounding process inherent in the reconstruction part of the compression/decompression processes.

Various manufacturers supply data compression/decompression integrated chips that include the DCT circuit 14, the quantizer circuit 18 and the entropy encoder circuit 20 within a single chip. Thus, since this and similar chips are readily available, a practical implementation of the circuit of FIG. 2, including the required and previous Q estimator circuits 24, 26, is illustrated in FIG. 3. Like components are similarly numbered, with a prime symbol added to components in the integrated chips of FIG. 3 which might not be precisely the same but are in essence equivalent.

As in FIG. 2, the image data are supplied via the bus 10 to the delay 16, and thence to an integrated compression chip 51 containing a DCT circuit 14', a quantizer circuit 18' and an encoder circuit 20'. The quantizer circuit 18' is supplied with the individual quantizer values via the bus 25, and the encoder circuit 20' supplies the compressed/encoded signal on the output bus 22. In like fashion, the required Q estimator circuit 24' includes an integrated compression chip 50 which includes the DCT circuit 14', the quantizer circuit 18' and the encoder circuit 20'. As in FIG. 2, the trial array of quantizer values is supplied to the quantizer circuit 18' via the bus 30. The encoder 20' of the chip 50 supplies a digital data stream corresponding to the actual number of data bits generated for a given data block to be recorded after the data is compressed, to counter means 52 of the required Q estimator circuit 24'. The output of the counter means 52 comprises the number of data bits counted per data block, and is supplied to a lookup table circuit 54. The lookup table in circuit 54 stores a Q factor identifier for each of a selected number of ranges of possible count results from the trial compression carried out in the chip 50. Each Q factor is that which, based on experimental data from a wide range of images, would produce the desired compression if used in place of the trial array of quantizer values first supplied on the bus 30. The number of bits produced by the trial compression thus determines the identification of the required Q factor to be selected. In the over-quantizing embodiment, the lookup table circuit 54 includes means for providing an offset in the stored lookup tables. Thus, a suitable input from, for example, a control panel (not shown) may set a selected offset of one or more lookup tables, to thereby supply, for example, the over-quantizing factor. The offset corresponds to the expected increase in image complexity. The corresponding identifier signal is supplied to the Q selector 28 at a field or frame rate depending upon whether the data source is field or frame based. The selector 28 may be a maximum value selector in a simple embodiment. The selector 28 supplies the resulting Q factor identifier signal to the tape recorder via the bus 32 and also supplies it to the Q lookup table circuit 27 at the field or frame rate. The circuit 27, in turn, supplies the individual quantizer values to the quantizer circuit 18' of the chip 51. Given a particular Q factor identifier signal, the Q lookup table circuit 27 produces the actual quantizer values of the array which is identified by the Q factor identifier signal.

In subsequent generations, as described in FIG. 2, the previous Q estimator circuit 26' also supplies a Q factor identifier signal corresponding to the Q factor previously used, to the Q selector 28. To this end, the transform coefficients from the DCT circuit 14' are supplied to a histogram counter circuit 46, which counts the occurrences of selected coefficients in terms of expected maximum and minimum amplitudes. As generally known, the histogram counter circuit 46 includes a plurality of counters, each of which is clocked in response to the receipt of its respective digital number. The resulting count signals are supplied to a peak detection/peak separation estimator circuit 48 which uses combinational logic or lookup tables to distinguish the maximum and minimum counts and thus the peaks and valleys of the histogram. To this end, the circuit 48 detects, for example, the separation between the peaks and then generates a signal indicative of the previously used Q factor identified by the peaks. Thus the circuit 48 includes a Q identifier which associates a particular Q factor with each value of peak separation. The identifier signal is supplied to the Q selector 28 which, along with the Q table circuit 27, supply the quantizer values to the quantizer circuit 18' via the bus 25, as previously described.

As discussed above, in situations where the previous Q factor is not available explicitly such as in second or subsequent generations wherein the over-quantizing factor selection technique is being applied, the Q factor is estimated from histograms of unquantized transform coefficients. In order for the described technique to determine the precise Q factor used, the Q factors must be drawn from a discreet set of Q factors which differ sufficiently for an unambiguous determination to be made. Furthermore, the Q factor should be uniquely determined from an estimate of relatively few quantizer values in the Q factor array. If some group of quantizer values in each array have the same value, then the precision of the technique is improved by including amplitudes from all the corresponding coefficients in a single histogram. For a DCT based system, for example, the lowest 3 or 5 AC coefficients may all be multiplied by the same quantizer value in any given array. The value of this quantizer value should differ from array to array, and will uniquely identify the array and hence distinguish all the quantizer values in the array.

In a first algorithm, for a known set of Q factors, the histogram accumulation may be limited to selected discreet amplitudes which represent selected known minima and maxima which could result from the set. Simplistically the largest maximum or smallest minimum should uniquely identify a particular Q factor. In practice some logical function of several maxima and minima will give a more reliable estimate. As an example, each quantizer may be represented by p histogram counters at expected maxima and expected minima. An estimator such as previous Q estimator 26 then identifies a particular Q factor only if its maximum counters are among the r highest counts and its minimum are among the m lowest. The choice of p, r and m depends on the set of Q factors to be discriminated and on the experimentally determined histogram variability for a particular application.

Figure 4:
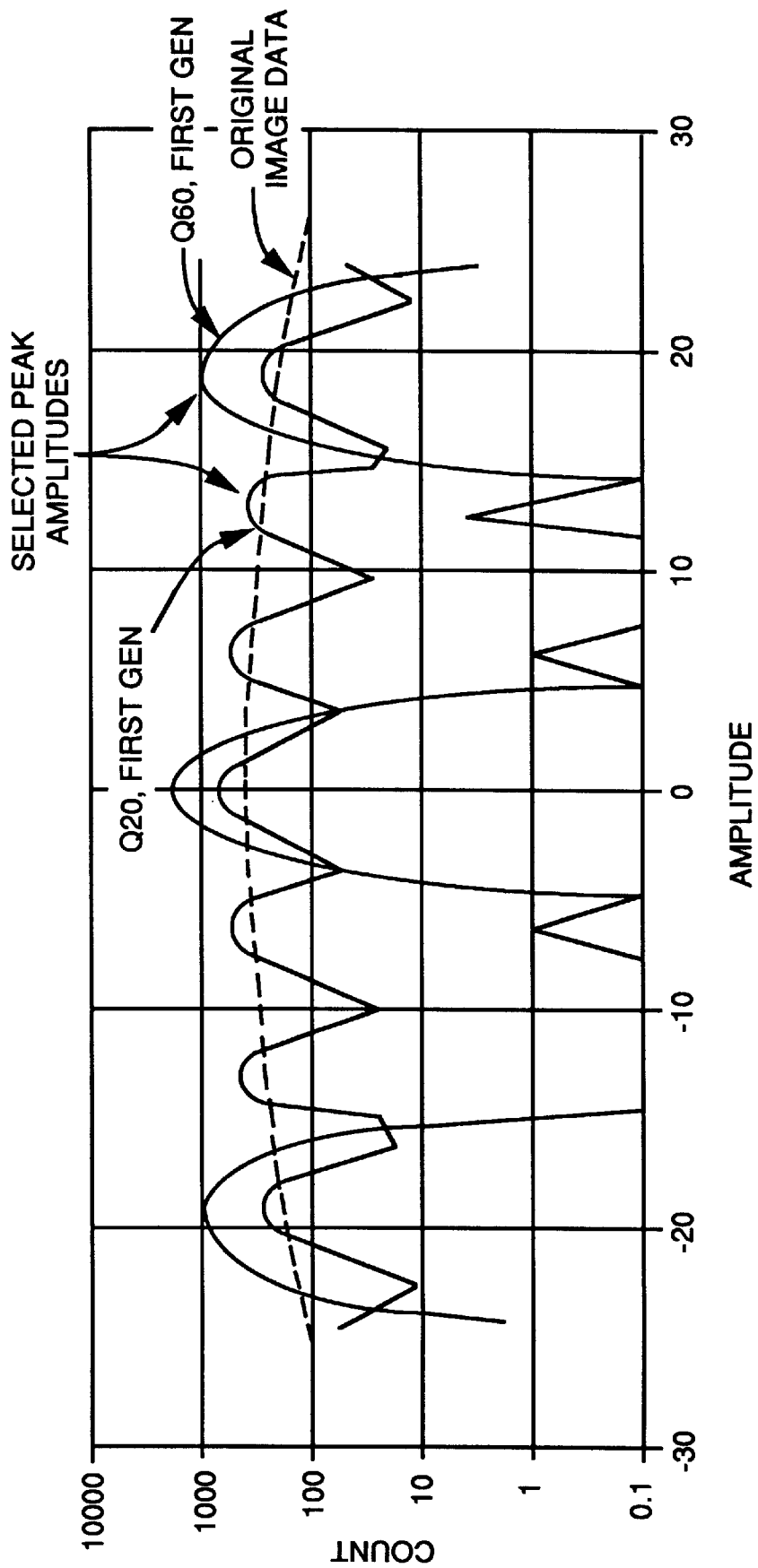
FIG. 4 is a graph illustrating a histogram of the measured outputs of the first five AC coefficients generated in a computer simulation of a data compression process used to compress a boat scene.

FIG. 4 illustrates a histogram of measured outputs of the first five AC coefficients generated in a computer simulation, and further augments the description above of the previous Q estimator circuits 26, 26'. The curves of the histogram depict the coefficient count versus amplitude of the original picture or image after the image data is transformed. In particular and as labeled in FIG. 4, the curves represent the original image data with no quantization, and the image data during first generations in which data compressions are performed using dividing quantizer values of 20 and 60, drawn from Q factors labeled for convenience Q20 and Q60. Thus, the histogram counter circuit 46 of FIG. 3 counts the number of occurrences of the amplitudes of selected coefficients as represented by the Q20 and Q60 curves in FIG. 4. The peak detection/peak separation estimator circuit 48 then distinguishes the peaks and/or valleys of the curves in the histogram, whereby the quantizing factor value used in the previous compression process is determined. That is, the separation between peaks in a histogram is equal to the dividing quantizer used. Several different algorithms may be used to measure the separation, as discussed in FIGS. 3 and 5.

In the general technique where over-quantizing Q factors are selected, the Q selector 28 supplies the over-quantizing factor value to the quantizer circuit 18' of chip 51. Then as described previously in FIG. 2, in subsequent generations after the first, the Q selector 28 first compares the required and previous Q factor values from circuits 24', 26', respectively. If the required Q factor is smaller than the previous Q factor used the last generation, then the Q selector 28 supplies the previous Q factor to the quantizer circuit 18'. That is, the value of the previously used larger Q factor from circuit 26' is used, as was used in the first generation. The same procedure is followed in subsequent generations, wherein the same preselected over-quantizing factor preferably is used throughout all the following generations.

Figure 5:
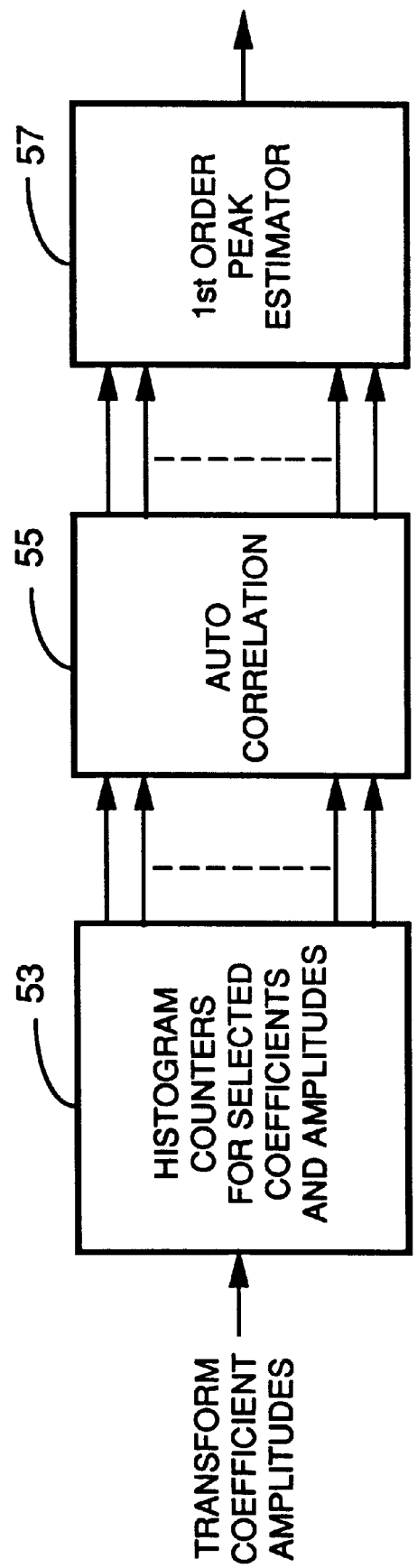
FIG. 5 is a block diagram illustrating an alternative embodiment of the previous Q estimator circuit of FIG. 3.

FIG. 5 illustrates an alternative embodiment of the previous Q estimator circuit 26' of FIG. 3, wherein an auto correlation, Fourier, or similar transform is applied to the histogram. In the corresponding algorithm, the fundamental frequency derived in the resulting output provides the period or peak separation directly. To this end, the transform coefficients are supplied from the DCT circuit 14' to a histogram counter circuit 53 similar to the circuit 46 of FIG. 3 in that the counters therein count the occurrences of selected coefficients in terms of their amplitudes. The resulting count signals are supplied to a generally conventional auto correlator circuit 55 which provides the fundamental frequency indicative of the peak separation directly. The resulting signal is supplied to a first order peak estimator circuit 57, which scans the auto correlator circuit 55 output for the largest non-zero order peak. Thus the estimator circuit 57 scans from a zero offset upwards while looking for a first minimum and then continues to scan until it finds a first maximum. Being dependent on many histogram values, this peak may be accurately determined. The circuit 57 supplies the previously used Q factor identifier signal to the Q selector 28.

It is to be understood that the previous Q estimator 26 and Q selector 28 of FIGS. 2, 3 are not required in the event that the invention technique of using a non-degenerative set of quantizing factors is used. That is, since a different Q factor is selected every generation with little increase in noise, there is no need to know the Q factor previously used, only the required Q factor.

If the Q factor is not changed during multiple generations of image data, it is acceptable in the quantizing process to employ a normal rounding algorithm of adding a constant 0.5 followed by truncation. However, if the Q factor is changed prior to a subsequent generation, then it is desirable, in accordance with the invention, to modify or "dither" the rounding algorithm to add a pseudo random number in the range 0 . . . 1 (instead of the constant 0.5) to all coefficient numbers greater than a preselected threshold. The preferred threshold generally is in the range of ±1 to 2. Information sufficient to allow the re-creation of the sequence of pseudo random numbers is forwarded along with the data. The regenerated sequence is effectively subtracted when the image data is decompressed.

The use of dither rounding is not applied in certain embodiments of the invention, such as when the Q factor is selected from the finite non-degenerative set of Q factors of previous mention. That is, dither rounding preferably is applied with the embodiment which uses over-quantizing factors, and then only when the Q factor is changed in a subsequent generation after the first generation. The dither rounding technique has advantages particularly when no attempt is made to use precisely the previous Q factor.

To further illustrate the technique of dither rounding, FIG. 6 depicts in functional block diagram, a typical rounding technique of adding a constant 0.5 to the coefficient values, and then truncating the fractional part of the resulting summations. To simplify the illustration, the coefficients are shown separated into an integer part and a fraction part, and the parts are supplied to an adder 60. A second input of a constant 0.5 also is supplied to the adder 60, which adds the 0.5 to the coefficient values. The results of the rounding process are provided by the integer part of the summation, with the fraction part of the summation being truncated to provide the rounding.

In accordance with the dither rounding technique of the invention, in FIG. 7 the coefficients again are depicted as integer and fraction parts, with the coefficient values supplied to an adder 62. A random number generator 64, which is initialized by an initialize signal input on a line 61, supplies a pseudo random number sequence to a second input of the adder 62 via a switch 63. A second contact of the switch 63 is coupled to a constant 0.5 signal source. A selector 65 which is responsive to a threshold input, is coupled to receive the coefficients generated by the DCT circuit. In a situation where the coefficient is less than the threshold, the selector 65 switches the switch to the constant 0.5 input and the conventional rounding technique is applied to the incoming coefficient. In accordance with the invention, when the coefficient is larger than the threshold, the selector 65 couples the psuedo random number generator 64 to the adder 62 via the switch 63. In the latter situation, the adder 62 adds the successive pseudo random numbers to respective coefficients, and supplies the integer parts of the summations to the encoder. The fraction parts of the summations are truncated, that is, are discarded. Optionally, the error introduced may be minimized by subtracting the pseudo random numbers. The initialize signal is forwarded along with the data, whereby the noise added due to the pseudo random numbers is partially subtracted from the signal in the decompression process. That is, the initialize signal identifies the start of the pseudo random sequence whereby it may be used in the decompression process. A certain amount of noise remains in the signal due to the information lost in the truncation process. As mentioned, the selector 65 switches in the dither rounding portion of the circuit only for coefficient values above the threshold which may be of the order of, for example, ±1 through ±3. The frequency spectrum of the pseudo random number sequence generally is selected to minimize the visibility of the residual noise, for example, may be evenly distributed or may be weighted towards higher frequencies.

FIG. 8 depicts one example of dither rounding recovery in the decompression process. The integers corresponding to the coefficients are supplied to a selector 67, to a first contact of a switch 68 and to a positive input of an adder/subtractor 66. The selector 67 also is supplied with a threshold input of, for example, ±1 through ±3. A constant 0.5 input signal is supplied to a second positive input of the adder/subtractor 66. A random number generator 64 receives the initialize signal forwarded from the compression process via the line 61, and supplies the same pseudo random number sequence to a negative input of the adder/subtractor 66. The adder/subtractor 66 provides an output of the combined integer and fraction parts corresponding to the transform coefficients, to a second input of the switch 68. The common output of the switch 68 supplies the coefficients to the inverse transform circuit 42 as in FIG. 2. Thus, the selector 67 provides the means for adaptively switching the switch 68 to the pseudo random number generator, that is, to the adder/subtractor 66 output when the coefficient value exceeds the threshold value, and vice versa. The coefficients are either rounded in accordance with a typical constant 0.5 rounding procedure, or are rounded in accordance with the dither rounding procedure of the invention, as determined by the threshold.

It is to be noticed that the dither rounding is applied uniquely directly to the transform coefficients supplied by the dequantizer 40.

It is to be understood that any procedure which is mathematically equivalent to the above dither rounding technique, is equally applicable. For example, an appropriate pseudo random number sequence in the range −0.5 to +0.5 is equivalent to the original sequence of 0 . . . 1.0.

Figure 9:
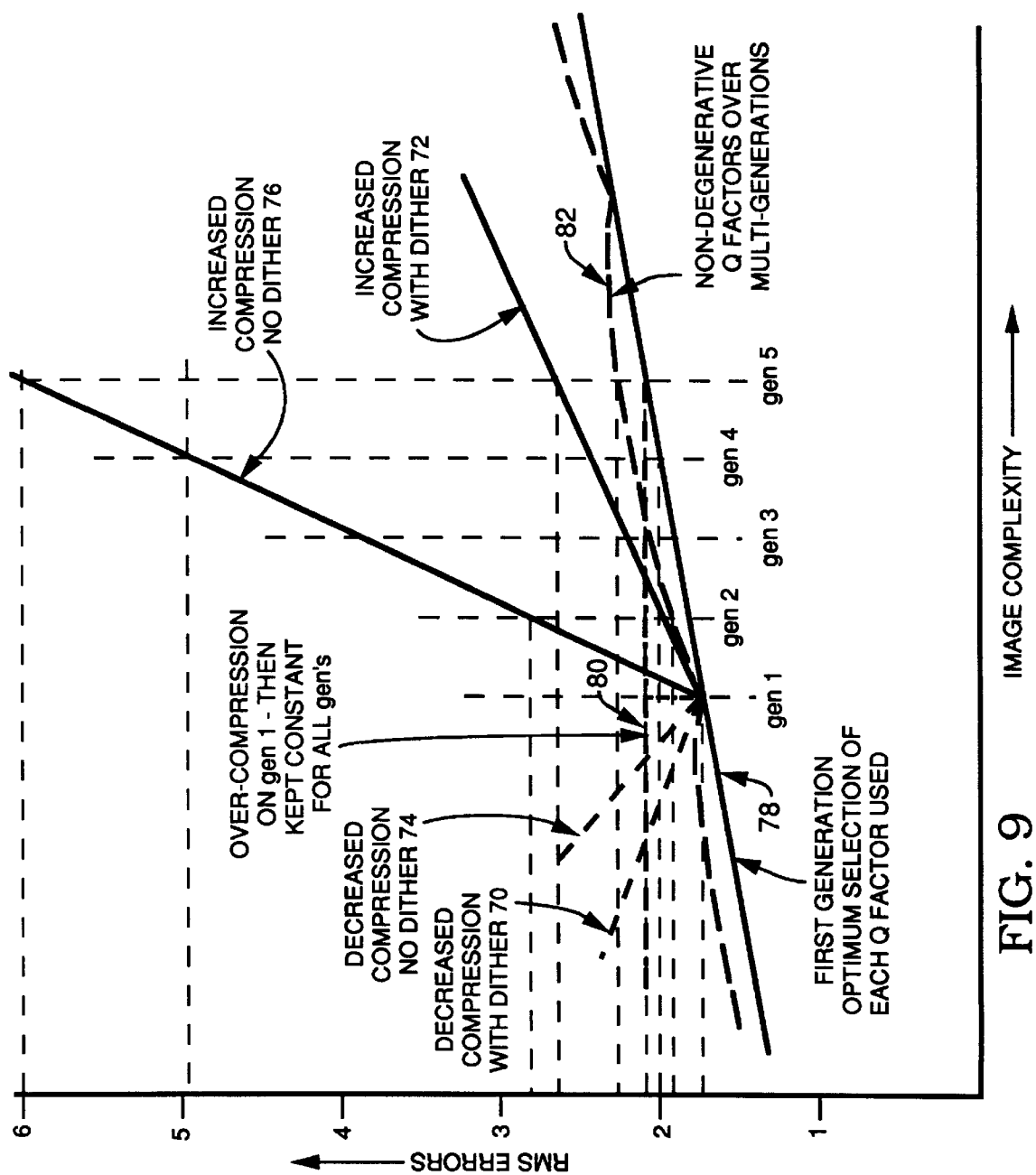
FIG. 9 is a graph qualitatively comparing RMS errors generated during multi-generation data compression processes when using prior art techniques and when using the invention techniques described herein.

The importance of the strategy of not changing the Q factor with each generation is emphasized in FIG. 9, which qualitatively illustrates the relationships between the invention embodiments of selecting an over-quantizing Q factor, of selecting a Q factor from the non-degenerative set of Q factors, and of dither rounding in the event an over-quantizing factor must be changed in a subsequent generation of multi-generations. The relationships apply in situations wherein image complexity is increased or decreased by data layering during a generation. The curves illustrate the relative root mean squared (RMS) errors for an image of varying complexity when applying the invention embodiments, and depict the RMS errors for a first and several subsequent generations, given specific Q factors chosen to provide a constant compression with and without the dither process of previous description. The "with dither" and "no dither" curves 70, 72 and 74, 76, respectively, (both pairs of solid line and short dash curves) apply to prior art techniques, as well as to the invention over-quantizing technique when the same over-quantizing value is changed in a subsequent generation of a multi-generation process. Note that the units used for RMS errors are qualitative and are used herein only as a means for comparing the decrease in RMS errors when using the invention techniques. It can be seen from the "first generation" curve 78 (solid line curve) that a significantly small change in RMS error results with increased or decreased complexity of the image, under conditions where the image data is being processed through a single generation, and an optimum Q factor is selected for each compression/decompression first generation. An optimum Q factor is that Q factor which precisely fits the data compressed thereby into the allotted data recording space or data rate, as is commonly done in prior art compression systems. The "over-compression" curve 80 (short dash dot curve) also illustrates the embodiment of over-quantizing the image data on the first generation, and then maintaining the same over-quantizing factor for subsequent generations in which layering may or may not be performed.

For example, assuming a Q factor which provides a compression ratio of 3:1 for the given image complexity, the RMS error for a first generation using an optimum selection of the Q factor is illustrated herein by curve 78 as about 1.7. In a second generation during which image complexity is increased due to layering, if a larger Q factor is used to provide the same 3:1 compression ratio, the RMS error will increase in accordance with the "no dither" curve 76 to about 2.8. However, if the larger (over-quantizing) Q factor had been selected for the first generation with RMS noise of about 2.1, and had been used again in the second generation, the RMS error will increase in accordance with the "over compression" curve 80 and would still remain at 2.1. That is, there is no increase in noise over that incurred in the first generation. Similarly, after five generations, with the image complexity increasing each generation due to layering, the RMS error generated by using a new, optimum Q factor each generation (as in the prior art) would be about 6.0 as depicted by the "no dither" curve 76. On the other hand, if the Q factor used in the fifth generation is still the same over-quantizing Q factor used in the first generation, and if the same over-quantizing Q factor has been used in the second through fourth generations, then the RMS error is still only about 2.1 as depicted by the over-quantizing curve 80. This is a marked improvement on the RMS error of 6.0 generated by the prior art system of selecting new, optimum Q factors for each generation.

In the event that an over-quantizing Q factor is selected and the complexity of the layered image after a few generations exceeds the capabilities of the over-quantizing Q factor, then the excessive RMS errors that would be generated may be sharply reduced by applying the dither rounding technique of the invention. To illustrate, changing the Q factors through the generations up to the fifth generation without using the over-quantizing technique or the dither rounding technique (see curve 76) would generate an RMS error of 6.0. On the other hand, applying the dither rounding technique reduces the RMS error to about 2.65 as derived from the "with dither" curve 72 of FIG. 9.

As illustrated by the curve 82 labeled "non-degenerative Q factors" (dashed heavy line), consistently low RMS errors are experienced in multi-generations of image data compression/decompression with layering, if the Q factor values are selected from the pre-defined finite non-degenerative sets of Q factors of previous mention. In such technique, a new and different Q factor may be selected for each subsequent generation of compression/decompression if, and only if, each Q factor is selected from the non-degenerative set. Thus, for example, if all quantizer values in the first generation Q factor array are 1, and if layering increases the complexity of the image data, then an effective Q factor for the second generation may be selected by changing some of the corresponding quantizer values in the subsequent array to 3 and/or 9. The numbers selected are commensurate with the added complexity of the image due to the layering process. Subsequent generations may utilize arrays wherein selected corresponding quantizer values are increased to 3 or 9 or even 27. That is, in a preferred embodiment, the corresponding linear quantizer values in successive arrays have a preferred numerical relationship of a ratio of approximately a factor of three. Thus the corresponding quantizer values of a non-degenerative set of arrays may be selected as a sequence 0.5, 1.5, 4.5, etc. or 2, 6, 18, etc., or any other usable sequence having a numerical relationship between corresponding non-degenerative quantizer values of successive arrays of approximately a factor of three.

In this latter non-degenerative Q factor embodiment, the Q factors may be said to be "over-quantizing" values in that they generally compress the image data sufficiently to allow the compressed data to readily fit into the desired data block spaces. That is, the non-degenerative set of Q factors generally do not precisely fit the compressed data into a given space in time or block length. Thus as depicted by the curve 82 in FIG. 9, the RMS error generated in the first generation mentioned above, using a corresponding Q factor (which is taken from a non-degenerative set of Q factors), is about 1.7. A second generation after layering has been performed and using a Q factor from the non-degenerative set, in which some of the quantizer values of the array are three times larger, provides an RMS error of about 1.9, and in the fifth generation an RMS error of about 2.25 is experienced. This RMS error also clearly is preferable to the error of 6.0 generated with the conventional method of changing Q factors each generation without dither rounding (curve 76), or the 2.65 error generated when further using dither rounding (curve 72).

As depicted by comparing the first generation curve 78 with the short dash curves 70, 74 labeled "with dither" and "no dither", respectively, it also is preferable to over-quantize and then maintain the same Q factor in a particular multi-generation operation, even when the complexity of the image is decreased after a first generation. As may be seen from the curve 74, the use of a smaller Q factor with each generation of less complexity, without using the dither rounding process, causes a significant increase in RMS error. Use of the dither rounding technique lessens the RMS error as shown by curve 70. However, it is preferable to maintain the same Q factor through the generations of decreasing image complexity, unless there is a significant decrease in image complexity. If there is a large decrease in complexity, (e.g., a factor of five) it is more practical to change the Q factor accordingly, to improve the picture quality. This is particularly true since the short dash curves 70, 74 curve downwardly to meet the curve 78 if they are plotted further to the left of the scale shown in FIG. 9.

However, it is even more preferable to use Q factors of the non-degenerative set during each of the generations, since then it is not necessary to determine the Q factor used in a previous generation of compression. Neither is it necessary to use the dither rounding process. However, there may be a compromise made in picture resolution due to the generally larger steps between the non-degenerative quantizer values in successive arrays.

Thus, it may be seen that, if successive generations of images increase in complexity, requiring an effective increase in compression ratio, a lower RMS error results by using either of the two techniques of the invention for selecting Q factors. In the first technique, the first generation is over-compressed and then the same quantizing factor is held constant for no further degradation in the image quality. It also is preferable to hold the Q factor constant even when successive generations would allow an effectively lower compression ratio. In the second technique, a Q factor is chosen from the predefined non-degenerative set of Q factors whose corresponding quantizer values have the special numerical relationship to each other, whereby a lower RMS error results even though a different Q factor may be selected for every generation of compression.

Concerning the second technique, criteria for selecting a non-degenerative set of quantizing factors are as follows. First, if quantization is increased in a particular generation, then the quantizer transfer function output=F (input), for each of the frequency components, must not have threshold values which are close to reconstruction values from the previous generation quantizer transfer function. In the absence of such a condition, reconstructed values which are spread slightly by the transform and other rounding processes, would split into two ranges, adding errors. Second, the reconstruction values must minimize errors for both a uniform distribution (first generation) and for values clustered around the reconstruction values of the previous generation. This implies that reconstruction values must lie approximately half way between threshold values, and must also be substantially a subset of the reconstruction values of the finer quantizer. Third, the reconstruction values preferably should also include the value zero to provide compression using run length coding. If there is to be freedom to choose any Q factor from the set at any generation, then the relationship of the above criteria should hold between all corresponding quantizer values in the set of arrays.

Examples of three non-degenerative linear quantizing transfer functions which meet the above criteria and which exemplify progressively coarser linear quantizing values, are as follows. As may be seen, reconstruction values are selected half way between threshold values, but clearly there are a range of values about the half way value which may be used as well. Likewise, a subset can have a range of values which effectively may be used, as contemplated by the invention.

F(a) quantizing threshold ±0.5 ±1.5 ±2.5 ±3.5 ±4.5
q=1 reconstruction value 0 ±1 2 ±3 ±4 ±5
F(b) quantizing threshold ±1.5 ±4.5 ±7.5 ±10.5 ±13.5
q=3 reconstruction value 0 ±3 ±6 ±9 ±12 ±15
F(c) quantizing threshold +4.5 ±13.5 ±22.5 ±31.5 ±40.5
q=9 reconstruction value 0 ±9 ±18 ±27 ±36 ±45

Examples of three non-degenerative non-linear quantizing transfer functions which have closer ratios than the ratio of 3:1 exemplified in the linear functions illustrated above, also may be constructed which meet the above first, second and third criteria. It is to be noticed however that the non-linear quantizing transfer functions do not have to comply with the condition of having a numerical relationship of the order of three between corresponding values in different arrays. The following series of threshold values is one example of acceptable progressively coarser non-linear quantizing values. Reconstruction values again are selected half way between threshold values, but may use a range of values.

F(a) quantizing threshold ±0.5 ±1.5 ±2.5 ±3.5 ±4.5
q=1 reconstruction value 0 ±1 ±2 ±3 ±4 ±5
F(b) quantizing threshold ±1.5 ±2.5 ±5.5 ±6.5 ±9.5
q=2 reconstruction value 0 ±2 ±4 ±6 ±8 ±10
F(c) quantizing threshold ±2.5 ±5.5 ±10.5 ±13.5 ±18.5
q=4 reconstruction value 0 ±4 ±8 ±12 ±16 ±20

This set has the advantage of smaller average ratios between arrays of the set, but the threshold intervals are not constant. Implementation would be more complex and would be inconsistent with the JPEG specification of previous mention.

A simpler technique for obtaining linear non-degenerative Q factors with individual quantizer values, may be derived from the relationship q value=$K*(3**n)$, where K is a constant for any one transform coefficient across the set of Q factors, and n is any positive integer including zero. The above computerized equation corresponds to the preferred mathematical equation q value=$K \cdot 3^n$). This equation may be used, for example, to generate the exemplary sequence 1, 3, 9, 27, for K=1. Normal rounding is assumed. If it is desired, for psychophysical reasons, to maintain particular ratios between quantizer values in an array, then n must be a constant for each array and K is selected for the psychophysical reasons, resulting in Q factors which grow by a factor of the order of three from array to array. This normally would not allow sufficient resolution in selecting a Q factor. If n is allowed to vary over the array elements, then the effective average Q factor may be changed in smaller steps but there would be abrupt changes in the quantizer value for a particular transform coefficient from one quantizer array to another.

Thus, as depicted in FIG. 9, there is a negligible multi-generation penalty in noise for an increase in data signal complexity by selecting a quantizing factor from the set of non-degenerative factors whose relationship is, or is approximately, a factor of three. There is a slightly increased penalty for choosing Q factors having a relationship of approximately three rather than precisely three. The penalty in noise for a relationship of three is depicted by the "non-degenerative" curve 82 particularly during the second through fourth generations, wherein the curve 82 indicates a slight increase in noise of about 0.2 compared to the curve 78, wherein the curve 78 depicts the distortion incurred in a first generation of compression of a data signal of the same complexity. It is of interest to note that the "non-degenerative" curve 82 starts at the first generation with the same RMS error of 1.7 as shown by the first generation compression process. However, as depicted in the FIG. 9, the "non-degenerative" curve 82 generates substantially the same RMS error as does the "first generation" curve 78 as the number of generations of the quantizing/dequantizing process increases with a corresponding increase in data signal complexity, due to the relationship of approximately the factor of three between the corresponding quantizer values of the non-degenerative arrays of Q factors.

To illustrate, a comparison of the non-degenerative curve 82 with the first generation curve 78 of FIG. 9 confirms that, when using the set of non-degenerative quantizing factors, the quantizing noise or degradation incurred by the data signal in multiple generations of data signal processing due to, for example, successive layering processes which result in a cumulative complexity change, is substantially the same as the data signal degradation incurred in a lesser number of generations (for example, one) having the same cumulative complexity change. Correspondingly, as also depicted in FIG. 9, the quantizing noise incurred in multiple generations of data signal layering of a selected cumulative level of complexity, will be substantially the same as the quantizing noise incurred in the data signal in a lesser number of generations of layering of the same selected level of complexity. To illustrate, with reference to FIG. 9, after the data signal has experienced four generations of quantizing/dequantizing (or dequantizing/quantizing) with a cumulative increase in data signal complexity shown along the X axis, the RMS error incurred is a little less than 2.2. This degradation compares very favorably with a first generation quantizing/dequantizing (or dequantizing/quantizing) process as shown by curve 78 of FIG. 9, in which the same increase in data signal complexity is experienced, and wherein the RMS error is 2.0. If the prior art technique of selecting a new quantizing factor for each of the four successive generations is used, given the same increase in cumulative complexity change, the RMS error incurred would be approximately 5.0 as depicted via the curve 76. This corresponds to an unacceptable degradation in the data signal.

The advantage of using the non-degenerative quantizing factor technique of the invention is shown in the curves of FIG. 9 with even more emphasis, when additional data signal complexity changes are made in the sixth and seventh generations. As depicted in FIG. 9, in the seventh generation the RMS error is approximately 2.3 for the non-degenerative curve 82 as compared to approximately 2.2 RMS error for the first generation curve 78. Ergo, after seven generations of cumulative complexity changes, the degradation incurred is substantially the same as that incurred in a generation having the same level of complexity change (see the first generation curve 78, at the seventh generation). Further, the corresponding degradation incurred in seven generations using seven respective first generation quantizing factors, given the same cumulative complexity change along the X axis, would be an unacceptable RMS error of greater than 8.0. The value is outside of the graph of FIG. 9 but may be derived by extending curve 76 to meet a vertical from the seventh generation along the X axis.

By way of further illustration, there follows an example of a set of "non-degenerative" arrays, wherein the quantizer values q have been selected using the formula of previous mention. To facilitate the description, the base table and the arrays Q1 through Q4 have only a 4 by 4 matrix, rather than the 8×8 matrix of previous discussion. Also, only four arrays are depicted although in practice, dozens or even hundreds of arrays are used. The base table provides the value of K for each frequency coefficient, which values may be based on psychophysical tests. In the subsequent arrays, a change in n within an array provides the associated change in the corresponding quantizer values from array to array, allowing smaller steps in the increasing quantizer values in the arrays.

| Base Table | | | | | | | |
|---|---|---|---|---|---|---|---|
| 10 | 10 | 10 | 15 | | | | |
| 10 | 10 | 15 | 15 | | | | |
| 10 | 15 | 15 | 19 | | | | |
| 15 | 15 | 19 | 23 | | | | |
| Q1 | | | | Q2 | | | |
| 10 | 10 | 10 | 15 | 10 | 10 | 10 | 45 |
| 10 | 10 | 15 | 15 | 10 | 10 | 45 | 45 |
| 10 | 15 | 15 | 19 | 10 | 45 | 45 | 57 |
| 15 | 15 | 19 | 23 | 45 | 45 | 57 | 207 |
| Q3 | | | | Q4 | | | |
| 10 | 10 | 30 | 45 | 10 | 10 | 30 | 45 |
| 10 | 30 | 45 | 45 | 10 | 30 | 45 | 45 |
| 30 | 45 | 45 | 57 | 30 | 45 | 45 | 171 |
| 45 | 45 | 171 | 207 | 45 | 135 | 171 | 207 |

The Q factor may be selected from any member of this set at any generation without incurring a multi-generation penalty in noise. It may be seen in FIG. 9 that most of the set results in RMS errors which are only slightly worse than for the default weighting used in the earlier simulations with variable Q factor. In any particular application, the slightly higher RMS error of using the non-degenerative set of Q factors, is a trade off for a simpler implementation which does not require the previous Q estimator circuit 26, 26' or the Q selector 28, nor the risk of selecting an inadequate margin as in the technique which selects an over-quantizing Q factor at the first generation compression.

What is claimed is:

1. A method of repetitively reproducing a digital data signal in which the quantizing noise introduced during dequantizing/quantizing processes is limited to substantially the quantizing noise introduced in an initial dequantizing/quantizing process, wherein the digital data signal after compression is sized according to a given data storage space or data rate constraint, said method comprising:

recovering and supplying said digital data signal from and to a recording media or other utilization system while performing the dequantizing/quantizing processes on the digital data signal;

repeating the step of recovering and supplying the digital data signal from and to said recording media or other utilization system to provide multiple generations of the digital data signal;

changing the complexity of the data signal by inserting additional data into, or deleting data from, said digital data signal between selected generations of the dequantizing/quantizing processes;

determining quantizing functions for first and subsequent generations, which quantizing functions limit the degradation in the quality of the digital data signal typically caused by the cumulative change in the complexity of the data signal introduced by the step of changing, to substantially the degradation incurred in the initial generation of the dequantizing/quantizing process in which the digital data signal has the same cumulative complexity change;

wherein the step of determining includes the steps of;

determining a first quantizing factor which would just fit the compressed digital data signal into said given data constraint;

selecting a second quantizing factor in the initial generation of dequantizing/quantizing which is at least one factor larger than the first quantizing factor;

significantly over-compressing the digital data signal in response to said second larger quantizing factor;

in the step of repeating, using the same larger second quantizing factor in the subsequent dequantizing/quantizing processes of said digital data signal after the initial generation; and producing a final digital data signal, in a last generation of the dequantizing/quantizing processes, which contains substantially only the quantizing noise introduced during said initial dequantizing/quantizing process.

2. The method of claim 1 wherein an identifying signal is stored together with the compressed data signal, which identifying signal identifies said second larger over-quantizing factor used in the quantizing process, and wherein the compressed data signal is dequantized in a dequantizing process, including the steps of;

recovering the compressed data signal along with said signal identifying said second larger over-quantizing factor used in the quantizing process;

storing a plurality of arrays of quantizer values including the array corresponding to said second larger over-quantizing factor used in the quantizing process; and dequantizing the compressed data with the array corresponding to said second larger over quantizing factor in response to the recovered identifying signal.

3. Apparatus for repetitively reproducing a digital image data signal in which the amount of distortion incurred by the digital image data signal in subsequent generations of a quantizing/dequantizing process after a prior generation of a quantizing/dequantizing process is limited, comprising:

means for supplying and recovering said digital data signal to and from a recording media or other utilization system;

means for repetitively enabling said means for supplying and recovering to provide multiple generations of the digital image data signal;

means for altering image data to change the information content of the image between at least some of the subsequent generations of data signal quantizing/dequantizing, to thereby change the cumulative complexity of an image represented by said digital image data signal;

means including memory means for providing quantizing factors for multiple generations of the quantizing/dequantizing process which limit the degradation in image quality caused by said cumulative changes in the image complexity introduced in subsequent generations, to substantially the degradation incurred in a lesser number of generations of the quantizing/dequantizing process in which the image complexity is substantially the same as said cumulative changes in the complexity; and means responsive to said memory for quantizing and dequantizing said digital image data signal during the generations of data signals.

4. The apparatus of claim 3 for compressing the digital image data signal into an allotted data storage space or data rate constraint, comprising:

transform means for transforming the image data signal into selected arrays of transform values;

means receiving the transform values and including quantizer selector means, for selecting from the memory means an over-quantizing factor in the first generation of the quantizing/dequantizing process which is significantly larger than a quantizing factor which just fits the compressed image data signal into said the allotted data constraint and which significantly over-compresses the image data signal such that the data signal significantly fails to provide the allotted data constraint;

quantizer means receiving the selected arrays of transform values for quantizing the transform values in response to the significantly larger over-quantizing factor, to provide said over-compressed image data signal; and wherein said quantizer selector memory and quantizer means apply the same significantly larger over-quantizing factor to transform values in said subsequent generations of the data signal quantizing/dequantizing process.

5. The apparatus of claim 3 for compressing the digital image data signal into an allotted data storage space or data rate constraint comprising:

means for transforming the digital image data signal into selected arrays of transform values;

said memory means including a predetermined finite set of quantizing factors each consisting of stored arrays of non-degenerative quantizer values, wherein corresponding quantizer values in successive stored arrays have a predetermined numerical relationship;

wherein said providing means includes quantizer estimator means receiving the transform values, for selecting a quantizing factor which would properly compress the image data signal into the allotted data constraint;

wherein, in response to said providing means, said memory means supplies a non-degenerative array of quantizer values from the stored arrays commensurate with the non-degenerative quantizing factor selected by the providing means;

quantizer means for compressing an array of transform values in response to the supplied non-degenerative array of quantizer values; and wherein the respective functions of said providing memory and quantizer means are repeated in each of the subsequent generations of the image data signal quantizing/dequantizing.

6. The apparatus of claim 5 wherein the means for providing said predetermined finite non-degenerative set of quantizing factors includes, microprocessor means for generating the set of quantizing factors from the relationship of, q value=K·(3ⁿ), where K is a constant for any one transform value across the set of quantizing factors, and n is any positive integer including zero.

7. The apparatus of claim 3, wherein said lesser number of generations is one generation.

8. In a system for dequantizing/quantizing a digital data signal which is being reproduced from and recorded on a recording media or recovered from and provided to a utilization system, wherein the digital data signal is compressed according to an allotted data storage space or data rate constraint in successive generations of data signal processing, between which the complexity of an image represented by the data signal may be changed, apparatus comprising:

means for repeatedly recovering and supplying said digital data signal from and to a recording media or other utilization system to provide multiple generations of the digital data signal;

layering means operatively coupled to said apparatus for changing the complexity of the image represented by the digital data signal to a selected cumulative level in at least one of the generations of the data signal dequantizing/quantizing process;

transform means for transforming the data signal into selected arrays of transform coefficients in each of said generations;

means receiving the selected arrays of transform coefficients and including quantizer selector means, for providing quantizing factors for multiple generations of quantizing which limit the degradation incurred by the image in subsequent generations of quantizing, given said selected cumulative level of image complexity, to substantially the degradation inherent in the quantizing process during a lesser number of generations having the same selected cumulative level of image complexity, while providing sufficient compression to size the compressed digital data signal according to said allotted data constraint in each of the generations of the data signal dequantizing/quantizing process; and quantizer means receiving the selected arrays of transform coefficients for quantizing the transform coefficients of each of the generations in response to the respective provided quantizing factors.

9. The apparatus of claim 8 wherein the digital data signal represents an image and wherein:

the providing means includes:

means for supplying a trial quantizing factor which would just size the compressed image data signal according to said allotted data constraint;

the quantizer selector means includes quantizer estimator means for providing an over-quantizing factor in an initial generation which is at least one quantizing factor larger than said trial quantizing factor, to substantially over-compress the image data signal such that the data signal significantly underfills said allotted data constraint; and wherein the quantizer selector means further provides the same larger over-quantizing factor through the subsequent generations of the image data signal dequantizing/quantizing process.

10. The apparatus of claim 9 wherein, the quantizer estimator means supplies a trial array of quantizer values which correspond to a mid-range quantizing factor for an image data signal of average image complexity;

the quantizer estimator means and quantizer selector means include a programmable store for storing a preselected number of arrays of selectively increasing quantizer values; and said quantizer selector means being responsive to the quantizer estimator means for providing said over-quantizing factor in the form of one of said stored arrays of quantizer values.

11. The apparatus of claim 10 wherein:

said quantizer estimator means includes a quantizing means for compressing the transform coefficients into a selected stream of data bits and means for counting the number of compressed data bits in the stream; and said programmable store includes a lookup table circuit containing said stored arrays of quantizer values, and responsive to the counting means for providing one of the arrays of quantizer values corresponding to said over-quantizing factor of at least one factor larger.

12. The apparatus of claim 9 including;

means including counting circuits for producing a histogram of the occurrences of selected amplitudes of at least one selected coefficient of the transform coefficients; and detector means for detecting the peaks or valleys of the histogram to determine a quantizing factor used in a previous generation of the image data signal dequantizing/quantizing process.

13. The apparatus of claim 9 wherein the over-quantizing factor is changed to another quantizing factor, including:

means for applying a psuedo random number sequence to the arrays of transform coefficients which exceed a selected threshold, to randomly roundoff the coefficients.

14. The apparatus of claim 8 wherein the digital data signal represents an image and the providing means includes:

a programmable memory for storing a finite non-degenerative set of quantizing factors in the form of arrays of non-degenerative quantizer values, wherein corresponding quantizer values in successive arrays have a predetermined numerical relationship;

means including a selector circuit for selecting a non-degenerative quantizing factor from the stored set which provides sufficient compression to compress the digital image data signal into said allotted data constraint in a respective generation of the image data signal dequantizing/quantizing process; and wherein said selector circuit thereafter selects in subsequent generations a non-degenerative quantizing factor from the stored set which compresses the image data signal into said allotted data constraint in response to a change in said selected cumulative level of complexity of the image data signal between the generations.

15. The apparatus of claim 14 wherein the programmable memory includes a look up table circuit for storing the arrays of non-degenerative quantizer values, and the corresponding quantizer values in successive arrays have a predetermined numerical relationship of approximately a factor of three.

16. The apparatus of claim 8 wherein said layering means retains at least a portion of a preceding generation of the image while changing the complexity of the image.

17. The system of claim 8, wherein said lesser number of generations is one generation.

18. An image data signal dequantizing/quantizing system for dequantizing and quantizing previously compressed image data signals in a manner such that a quantizing factor used in a previous generation of data signal compression is substantially the same quantizing factor as is used in the next generation of data signal compression, comprising:

means for recovering an image data signal from a recording media or other utilization media;

transform means for transforming the data signal into correspondent transform values;

means receiving the transform values and including counting circuits for determining the number of occurrences of selected amplitudes of at least one transform value;

peak and valley detecting means responsive to the determining means for distinguishing the amplitude which has the largest or the smallest number of occurrences;

wherein the peak and valley detecting means includes:

auto correlation means responsive to the counting circuits for providing an auto correlation signal indicative of successive peak separation; and first order peak estimator means for scanning the auto correlation signal for the largest non-zero order peak, which is indicative of the quantizing factor of said previous generation;

means for quantizing the image data signal with said quantizing factor in said next generation; and means responsive to said quantizing means for supplying the quantized image data signal to said recording media or other utilization device.

19. A method of repetitively reproducing a digital data signal that represents an image, in which quantizing noise introduced during digital data signal dequantizing/quantizing processes is limited, wherein an initial generation and subsequent multiple generations of dequantizing/quantizing processes are performed on the digital data signal, comprising the steps of:

recovering and supplying said digital data signal from and to a recording media or other utilization system;

repeating the step of recovering and supplying the digital data signal from and to said recording media or other utilization system to provide multiple generations of the image represented by the digital data signal;

changing the complexity of the image represented by the data signal to a selected cumulative complexity change by a layering process which alters image data to change the information content of the image, and which is performed between said subsequent multiple generations of the digital data signal dequantizing/quantizing processes;

generating quantizing functions for each of the initial and subsequent generations of the dequantizing/quantizing processes, wherein the degradation incurred by the image in said subsequent multiple generations of the dequantizing/quantizing processes during which said selected cumulative complexity change occurs, is substantially the same as the image degradation incurred in a lesser number of generations having said cumulative complexity change;

dequantizing and quantizing said digital data signal during the initial and subsequent generations using the quantizing functions provided in said step of generating; and producing a final digital data signal, in a last generation of the dequantizing/quantizing processes, which contains substantially only the degradation incurred in said lesser number of generations.

20. The method of claim 19 wherein the step of generating include the steps of:

providing a finite non-degenerative set of quantizing factors, each set comprising arrays of non-degenerative quantizer values, wherein corresponding quantizer values in successive arrays have a predetermined numerical relationship.

21. The method of claim 20 wherein the set of quantizing factors define a linear quantizing function, and the numerical relationship is approximately a factor of three.

22. The method of claim 21 wherein the step of providing the set of linear quantizing factors further includes;

selecting quantizer threshold values which are not close to reconstruction values from the quantizing function of a finer quantizing value;

selecting reconstruction values that lie within a range approximately half way between threshold values and are substantially a subset of the reconstruction values of a finer quantizing value;

selecting said reconstruction values such that they also include the value zero; and maintaining the relationship of the above steps of selecting between all corresponding quantizing values in the set of arrays.

23. The method of claim 20 wherein the set of quantizing factors define a non-linear quantizing function, and the numerical relationship is less than approximately a factor of three.

24. The method of claim 23 wherein the step of providing the set of non-linear quantizing factors includes:

selecting quantizer threshold values which are not close to reconstruction values from the quantizing function of a finer quantizing value;

selecting reconstruction values that lie within a range approximately half way between threshold values and are substantially a subset of the reconstruction values of a finer quantizing value; and maintaining the relationship of the above steps of selecting between all corresponding quantizing values in the set of arrays.

25. The method of claim 20 wherein the digital data signal is compressed according to a given data storage space or data rate constraint, including the steps of:

selecting in each generation a quantizing function from said set which provides sufficient compression to compress the data signal into said given data constraint; and repeating the step of selecting a quantizing function from said set in accordance with said change in data signal cumulative complexity for each subsequent generation of the dequantizing/quantizing process.

26. The method of claim 19 wherein the step of changing the complexity of the image includes the step of retaining at least a portion of the generation of the image which existed prior to said changing step.

27. The method of claim 19, wherein said lesser number of generations is one generation.

28. In a system for dequantizing/quantizing a digital signal which is reproduced from and recorded on a recording media or recovered from and provided to a utilization system, wherein the digital data signal is decompressed from and compressed into an allotted data storage space or data rate constraint, in multiple generations of the digital data signal dequantizing/quantizing process, wherein the digital data signal is transformed into selected transform values, apparatus comprising:

means for repeatedly recovering and supplying said digital data signal from and to a recording media or other utilization system to provide said multiple generations;

layering means operatively coupled to said apparatus for incrementally changing the complexity of the digital data signal between selected generations of the dequantizing/quantizing process to provide a selected cumulative complexity change;

a source of arrays of non-degenerative quantizer values, wherein corresponding quantizer values in successive arrays have a numerical relationship of approximately a factor of three;

a quantizer estimator circuit disposed to receive the digital data signal, for transforming the digital data signal into said selected transform values, said source of arrays being responsive to the quantizer estimator circuit;

wherein said quantizer estimator circuit in initial and subsequent generations of the dequantizing/quantizing process selects from the source of arrays an array of said non-degenerative quantizer values which compresses the digital data signal into said allotted data constraint in response to any change in said cumulative complexity of the digital data signal between each generation;

quantizer means responsive to the quantizer estimator circuit for quantizing the transform values of each of the generations; and means, including said means for supplying, for producing a final digital data signal in a final generation, which final signal incurs a degradation corresponding substantially to the degradation incurred in a lesser number of generations having said selected cumulative complexity change.

29. The apparatus of claim 28 wherein:

said quantizer estimator circuit selects non-degenerative quantizer values from the source of arrays, wherein the degradation incurred by the data signal in a succession of multiple generations which experience the data signal layering of selected cumulative complexity change, is substantially the same as the degradation incurred in the data signal in a lesser number of generations experiencing substantially the same said selected cumulative complexity change.

30. The apparatus of claim 29 wherein the dequantizing/quantizing system includes a quantizer circuit, and wherein said source of arrays includes a programmable memory for supplying said selected array of non-degenerative quantizer values to the quantizer circuit in response to the quantizer estimator circuit.

31. The apparatus of claim 29 wherein the data signal represents an image in the form of the transform values, and said source of arrays includes, microprocessor means for deriving the arrays of non-degenerative quantizing factors from the relationship of, q value $=K \cdot (3^n)$, where K is a constant for any one transform value across the arrays of quantizer values, and n is any positive integer including zero.

32. The system of claim 28, wherein said lesser number of generations is one generation.

33. A method of reproducing a data signal which digitally represents an image, the method comprising the steps of producing a multiplicity of generations of the data signal, each generation including a process of quantization of the data signal pursuant to quantization factors, so as to compress the image data to within a given constraint, and a process of de-quantization and thereby decompression, the method also including altering the complexity of the image data between selected generations by the replacement of a portion of the image data, the image being subject to degradation owing to the production of quantization noise; wherein at least some of the quantization factors for the processes of quantization provide more compression than that due to an optimum factor which would fit the data signal when compressed exactly into said constraint and are selected and related to reduce substantially the quantization noise produced in the generations after the first relative to the noise which would be produced by the use of such an optimum quantization factor in those generations.

34. The method of claim 33 including the steps of:

transforming the digital data signal into selected transform coefficients prior to compressing the data signal;

changing a quantizing factor in one of the generations of data signal quantizing/dequantizing processes and applying a pseudo random number sequence to selected transform coefficients which exceed a selected threshold, to randomly roundoff the coefficients.

35. The method of claim 34 including the step of:

generating the pseudo random number sequence within a range of 0 to 1.0 and with a pre-selected energy spectrum, for use in the step of applying.

36. The method of claim 33 wherein a generation of the data signal quantizing/dequantizing process subsequent to the initial generation is to be compressed and said quantizing factor from the initial generation is not known, including the steps of:

transforming the digital data signal of the subsequent generation into respective transform coefficients prior to quantizing the data signal;

generating a histogram of amplitudes of at least one selected coefficient of the respective transform coefficients; and detecting the peaks or valleys of the histogram to determine the quantizing factor used in the initial generation.

37. A method according to claim 33 wherein the quantization factors for the processes of quantization are selected only from a predefined finite non-degenerative set of factors, and the selected factors or close approximations thereof are employed in the various quantization processes, to thereby reduce in generations after the first the production of quantization noise arising from requantization of data which has been quantized in a previous generation.

38. A method according to claim 37 wherein the quantizing factors correspond to multiple arrays of quantizer values, wherein corresponding quantizer values in successive arrays have a predetermined numerical relationship.

39. A method according to claim 38, wherein the numerical relationship is about three and the non-degenerative set of quantizing factors is linear.

40. A method according to claim 38 wherein the non-degenerative set of quantizing factors is non-linear and the numerical relationship is less than three.

41. A method according to claim 38, including the steps of storing a plurality of lookup tables corresponding to the non-degenerative multiple arrays of quantizer values; and selecting a lookup table which provides the array to compress the data signal into the constraint.

42. A method according to claim 37 wherein the data signal is in the form of transform coefficients, and wherein the non-degenerative set of quantizing factors are given by the expression $K*(3**n)$, wherein K is a constant for any one transform coefficient across the set of quantizing factors, and n is any positive integer including zero.

43. A method according to claim 37, further including the steps of supplying a trial array of quantizer values; determining whether the trial array of quantizer values provides a fit of the data into the constraint; performing any necessary iterations on the quantizer values; identifying a quantizing factor from said non-degenerative set which provides sufficient compression to provide said fit; selecting an array of quantizer values from said non-degenerative set which corresponds to said quantizing factor; and quantizing the data signal in response to the selected array of quantizer values.

44. A method of reproducing a data signal, comprising the steps of producing a multiplicity of generations of the data signal, each generation including a process of quantization of the data signal according to quantization factors, so as to compress the data signal to within a given constraint, and a process of de-quantization and thereby decompression, the method also including altering the complexity of the data signal between selected generations by the replacement of a portion of the data signal, the data being subject to degradation owing to the production of quantization noise; wherein quantization factors for the processes of quantization are selected only from a predefined finite non-degenerative set of factors, and the selected factors or close approximations thereof are employed in the various quantization processes, the non-degenerative set being such that reconstruction values in a relatively coarse quantization are a sub-set of the reconstruction values in a relatively fine quantization in a different generation, to thereby reduce in generations after the first the production of quantization noise arising from requantization of data which has been quantized in a previous generation.

45. A method according to claim 44 wherein the data signal represents an image and the alteration of the data signal corresponds to a modification of data within the image.

46. A method of reproducing a data signal in which a multiplicity of generations of the data signal are produced, each generation including a process of quantization of the data signal, so as to compress the data signal to within a given constraint, and a process of dequantization and thereby decompression, the method comprising the steps of:

altering the complexity of the data signal between selected generations by the replacement of a portion of the data signal, the data being subject to degradation owing to the production of quantization noise;

selecting quantization factors for the processes of quantization only from a pre-defined finite non-degenerative set of quantizing factors; and employing the selected factors or close approximations in the various quantization processes, to thereby reduce in generations after the first the production of quantization noise arising from requantization of data which has been quantized in a previous generation.

47. The method of claim 46 wherein the data signal is in the form of transform coefficients, further including the steps of:

supplying an array of said quantizing factors;

determining any error in constraint relative to the given constraint of a portion of the quantized data signal;

selecting a quantizing factor from said non-degenerative set of factors based on said error; and applying the selected quantizing factor to a remaining portion of the data signal.

48. A method of generating quantizer values for quantizing/dequantizing a data signal which is recorded in or reproduced from a recording media or provided to and recovered from a utilization system, wherein the data signal is compressed into and decompressed from a given data rate or data space constraint in a generation of the data signal quantizing/dequantizing process, wherein the data signal is transformed into selected transform values, comprising the steps of:

providing arrays of non-degenerative quantizer values, wherein corresponding quantizer values in successive arrays have a predetermined numerical relationship, said step of providing the arrays of non-degenerative quantizer values including the steps of:

determining quantizer threshold values which are not close to reconstruction values from the quantizing function of a finer quantizing value;

determining reconstruction values that lie within a range approximately halfway between threshold values and are substantially a subset of the reconstruction values of a finer quantizing value; and maintaining the relationship of the above steps of selecting between all corresponding quantizing values in the set of arrays.

49. The method of claim 48 including the step of:

determining said reconstruction values such that they also include the value zero.

50. The method of claim 48 wherein the reconstruction values are integer values.

* * * * *